US010955552B2

(12) United States Patent
Fine et al.

(10) Patent No.: US 10,955,552 B2
(45) Date of Patent: Mar. 23, 2021

(54) WAVEFORM DESIGN FOR A LIDAR SYSTEM WITH CLOSELY-SPACED PULSES

(71) Applicant: APPLE INC., Cupertino, CA (US)

(72) Inventors: Nadav Fine, Tel Aviv (IL); Oz Barak, Tel Aviv (IL); Tal Kaitz, Kiryat Ono (IL)

(73) Assignee: APPLE INC., Cupertino, CA (US)

(*) Notice: Subject to any disclaimer, the term of this patent is extended or adjusted under 35 U.S.C. 154(b) by 494 days.

(21) Appl. No.: 15/844,665

(22) Filed: Dec. 18, 2017

(65) Prior Publication Data

US 2019/0094364 A1 Mar. 28, 2019

Related U.S. Application Data

(60) Provisional application No. 62/563,769, filed on Sep. 27, 2017.

(51) Int. Cl.
*G01C 3/08* (2006.01)
*G01S 17/10* (2020.01)
*G01S 17/32* (2020.01)
*G01S 17/894* (2020.01)

(52) U.S. Cl.
CPC .............. *G01S 17/10* (2013.01); *G01S 17/32* (2013.01); *G01S 17/894* (2020.01)

(58) Field of Classification Search
CPC .......... G01S 17/10; G01S 17/32; G01S 17/89; G01S 7/4876; G01S 17/42; G01S 7/4814; G01S 17/06; G01S 7/4817; G01S 7/4815
See application file for complete search history.

(56) References Cited

U.S. PATENT DOCUMENTS

| 4,623,237 A | 11/1986 | Kaneda et al. |
| 4,757,200 A | 7/1988 | Shepherd |
| 5,164,823 A | 11/1992 | Keeler |
| 5,270,780 A | 12/1993 | Moran et al. |
| 5,699,149 A | 12/1997 | Kuroda et al. |

(Continued)

FOREIGN PATENT DOCUMENTS

| CN | 103763485 A | 4/2014 |
| CN | 104914446 A | 9/2015 |

(Continued)

OTHER PUBLICATIONS

U.S. Appl. No. 15/586,286 office action dated Dec. 2, 2019.

(Continued)

*Primary Examiner* — Samantha K Abraham
(74) *Attorney, Agent, or Firm* — Kligler & Associates Patent Attorneys Ltd (57) ABSTRACT

Depth-sensing apparatus includes a laser, which is configured to emit pulses of optical radiation toward a scene. One or more detectors are configured to receive the optical radiation that is reflected from points in the scene and to output signals indicative of respective times of arrival of the received radiation. Control and processing circuitry is coupled to drive the laser to emit a succession of output sequences of the pulses with different, respective temporal spacings between the pulses within the output sequences in the succession, and to match the times of arrival of input sequences of the signals to the temporal spacings of the output sequences in order to find respective times of flight for the points in the scene.

16 Claims, 4 Drawing Sheets

(56) References Cited

U.S. PATENT DOCUMENTS

| | | | |
|---|---|---|---|
| 6,301,003 B1 | 10/2001 | Shirai et al. |
| 6,384,903 B1 | 5/2002 | Fuller |
| 6,710,859 B2 | 3/2004 | Shirai et al. |
| 7,126,218 B1 | 10/2006 | Darveaux et al. |
| 7,193,690 B2 | 3/2007 | Ossig et al. |
| 7,303,005 B2 | 12/2007 | Reis et al. |
| 7,405,812 B1 | 7/2008 | Bamji |
| 7,508,496 B2 | 3/2009 | Mettenleiter et al. |
| 7,800,067 B1 | 9/2010 | Rajavel et al. |
| 7,812,301 B2 | 10/2010 | Dike et al. |
| 7,969,558 B2 | 6/2011 | Hall |
| 8,193,482 B2 | 6/2012 | Itsler |
| 8,259,293 B2 | 9/2012 | Andreou |
| 8,275,270 B2 | 9/2012 | Shushakov et al. |
| 8,355,117 B2 | 1/2013 | Niclass |
| 8,405,020 B2 | 3/2013 | Menge |
| 8,675,181 B2 | 3/2014 | Hall |
| 8,736,818 B2 | 5/2014 | Weimer et al. |
| 8,766,164 B2 | 7/2014 | Sanfilippo et al. |
| 8,766,808 B2 | 7/2014 | Hogasten |
| 8,925,814 B1 | 1/2015 | Schneider et al. |
| 8,963,069 B2 | 2/2015 | Drader et al. |
| 9,002,511 B1 | 4/2015 | Nickerson et al. |
| 9,024,246 B2 | 5/2015 | Jiang et al. |
| 9,052,356 B2 | 6/2015 | Chu et al. |
| 9,076,707 B2 | 7/2015 | Harmon |
| 9,016,849 B2 | 8/2015 | Duggal et al. |
| 9,465,111 B2 | 10/2016 | Wilks et al. |
| 9,516,248 B2 | 12/2016 | Cohen et al. |
| 9,709,678 B2 | 7/2017 | Matsuura |
| 9,736,459 B2 | 8/2017 | Mor et al. |
| 9,739,881 B1 | 8/2017 | Pavek et al. |
| 9,786,701 B2 | 10/2017 | Mellot et al. |
| 9,810,777 B2 | 11/2017 | Williams et al. |
| 9,874,635 B1 | 1/2018 | Eichenholz et al. |
| 10,063,844 B2 | 8/2018 | Adam et al. |
| 10,132,616 B2 | 11/2018 | Wang |
| 10,203,399 B2* | 2/2019 | Retterath ............... G01S 17/10 |
| 10,215,857 B2 | 2/2019 | Oggier et al. |
| 10,269,104 B2 | 4/2019 | Hannuksela et al. |
| 10,386,487 B1 | 8/2019 | Wilton et al. |
| 10,424,683 B1 | 9/2019 | Do Valle et al. |
| 2001/0020673 A1 | 9/2001 | Zappa et al. |
| 2002/0071126 A1 | 6/2002 | Shirai et al. |
| 2002/0131035 A1 | 9/2002 | Watanabe et al. |
| 2002/0186362 A1 | 12/2002 | Shirai et al. |
| 2004/0051859 A1 | 3/2004 | Flockencier |
| 2004/0135992 A1 | 7/2004 | Munro |
| 2006/0106317 A1 | 5/2006 | McConnell et al. |
| 2007/0145136 A1 | 6/2007 | Wiklof et al. |
| 2009/0009747 A1 | 1/2009 | Wolf et al. |
| 2009/0262760 A1 | 10/2009 | Krupkin et al. |
| 2009/0273770 A1 | 11/2009 | Bauhahn et al. |
| 2009/0275841 A1 | 11/2009 | Melendez et al. |
| 2010/0019128 A1 | 1/2010 | Itzler |
| 2010/0045965 A1* | 2/2010 | Meneely ............... G01S 17/10 |
| | | 356/5.01 |
| 2010/0096459 A1 | 4/2010 | Gurevich |
| 2010/0121577 A1* | 5/2010 | Zhang ............... G01S 17/931 |
| | | 701/301 |
| 2010/0250189 A1 | 9/2010 | Brown |
| 2010/0286516 A1* | 11/2010 | Fan ............... A61B 8/08 |
| | | 600/438 |
| 2011/0006190 A1 | 1/2011 | Alameh et al. |
| 2011/0128524 A1 | 6/2011 | Vert et al. |
| 2011/0181864 A1 | 7/2011 | Schmitt et al. |
| 2012/0038904 A1 | 2/2012 | Fossum et al. |
| 2012/0075615 A1 | 3/2012 | Niclass et al. |
| 2012/0132636 A1 | 5/2012 | Moore |
| 2012/0153120 A1 | 6/2012 | Baxter |
| 2012/0176476 A1* | 7/2012 | Schmidt ............... G01S 17/894 |
| | | 348/46 |
| 2012/0249998 A1 | 10/2012 | Eisele et al. |
| 2012/0287242 A1 | 11/2012 | Gilboa et al. |
| 2012/0294422 A1 | 11/2012 | Cheung et al. |
| 2013/0015331 A1 | 1/2013 | Birk et al. |
| 2013/0079639 A1 | 3/2013 | Hoctor et al. |
| 2013/0092846 A1 | 4/2013 | Henning et al. |
| 2013/0208258 A1 | 8/2013 | Eisele et al. |
| 2013/0236171 A1 | 9/2013 | Saunders |
| 2013/0258099 A1 | 10/2013 | Ovsiannikov et al. |
| 2013/0278917 A1 | 10/2013 | Korekado et al. |
| 2013/0300838 A1 | 11/2013 | Borowski |
| 2013/0342835 A1 | 12/2013 | Blacksberg |
| 2014/0027606 A1 | 1/2014 | Raynor et al. |
| 2014/0077086 A1 | 3/2014 | Batkilin et al. |
| 2014/0078491 A1 | 3/2014 | Eisele et al. |
| 2014/0191115 A1 | 7/2014 | Webster et al. |
| 2014/0198198 A1 | 7/2014 | Geissbuehler et al. |
| 2014/0231630 A1 | 8/2014 | Rae et al. |
| 2014/0240317 A1 | 8/2014 | Go et al. |
| 2014/0240691 A1 | 8/2014 | Mheen et al. |
| 2014/0268127 A1* | 9/2014 | Day ............... G01J 3/0208 |
| | | 356/300 |
| 2014/0300907 A1 | 10/2014 | Kimmel |
| 2014/0321862 A1 | 10/2014 | Frohlich et al. |
| 2014/0353471 A1 | 12/2014 | Raynor et al. |
| 2015/0041625 A1 | 2/2015 | Dutton et al. |
| 2015/0062558 A1 | 3/2015 | Koppal et al. |
| 2015/0131080 A1 | 5/2015 | Retterath et al. |
| 2015/0163429 A1 | 6/2015 | Dai et al. |
| 2015/0192676 A1 | 7/2015 | Kotelnikov et al. |
| 2015/0200222 A1 | 7/2015 | Webster |
| 2015/0200314 A1 | 7/2015 | Webster |
| 2015/0260830 A1 | 9/2015 | Ghosh et al. |
| 2015/0285625 A1 | 10/2015 | Deane et al. |
| 2015/0362585 A1 | 12/2015 | Ghosh et al. |
| 2016/0003944 A1 | 1/2016 | Schmidtke et al. |
| 2016/0041266 A1 | 2/2016 | Smits |
| 2016/0072258 A1 | 3/2016 | Seurin et al. |
| 2016/0080709 A1 | 3/2016 | Viswanathan et al. |
| 2016/0259038 A1 | 9/2016 | Retterath et al. |
| 2016/0259057 A1 | 9/2016 | Ito |
| 2016/0274222 A1 | 9/2016 | Yeun |
| 2017/0038459 A1 | 2/2017 | Kubacki et al. |
| 2017/0052065 A1 | 2/2017 | Sharma et al. |
| 2017/0067734 A1 | 3/2017 | Heidemann et al. |
| 2017/0131388 A1 | 5/2017 | Campbell et al. |
| 2017/0131718 A1 | 5/2017 | Matsumura et al. |
| 2017/0176577 A1 | 6/2017 | Halliday |
| 2017/0176579 A1 | 6/2017 | Niclass et al. |
| 2017/0179173 A1 | 6/2017 | Mandai et al. |
| 2017/0184450 A1 | 6/2017 | Doylend et al. |
| 2017/0184704 A1 | 6/2017 | Yang et al. |
| 2017/0184709 A1* | 6/2017 | Kienzler ............... G01S 7/487 |
| 2017/0188016 A1 | 6/2017 | Hudman et al. |
| 2017/0219695 A1 | 8/2017 | Hall et al. |
| 2017/0242102 A1 | 8/2017 | Dussan et al. |
| 2017/0242108 A1 | 8/2017 | Dussan et al. |
| 2017/0257617 A1 | 9/2017 | Retterath |
| 2017/0269209 A1* | 9/2017 | Hall ............... G01S 17/10 |
| 2017/0303789 A1 | 10/2017 | Tichauer et al. |
| 2017/0329010 A1 | 11/2017 | Warke et al. |
| 2017/0356796 A1 | 12/2017 | Nishio |
| 2017/0356981 A1 | 12/2017 | Yang et al. |
| 2018/0045816 A1 | 2/2018 | Jarosinski et al. |
| 2018/0059220 A1 | 3/2018 | Irish et al. |
| 2018/0062345 A1 | 3/2018 | Bills et al. |
| 2018/0081032 A1 | 3/2018 | Torruellas et al. |
| 2018/0131449 A1 | 5/2018 | Kare et al. |
| 2018/0167602 A1 | 6/2018 | Pacala et al. |
| 2018/0203247 A1 | 7/2018 | Chen et al. |
| 2018/0205943 A1 | 7/2018 | Trail |
| 2018/0299554 A1 | 10/2018 | Van Dyck et al. |
| 2019/0011567 A1 | 1/2019 | Pacala et al. |
| 2019/0018118 A1 | 1/2019 | Perenzoni et al. |
| 2019/0018143 A1 | 1/2019 | Thayer et al. |
| 2019/0056497 A1 | 2/2019 | Pacala et al. |

(56) References Cited

U.S. PATENT DOCUMENTS

| | | |
|---|---|---|
| 2019/0170855 A1 | 6/2019 | Keller et al. |
| 2020/0314294 A1 | 10/2020 | Schoenlieb et al. |

FOREIGN PATENT DOCUMENTS

| | | |
|---|---|---|
| CN | 106405572 A | 2/2017 |
| DE | 202013101039 U1 | 3/2014 |
| EP | 2157445 A2 | 2/2010 |
| EP | 2469297 A1 | 6/2012 |
| EP | 2477043 A1 | 7/2012 |
| EP | 2827175 A2 | 1/2015 |
| EP | 3285087 A1 | 2/2018 |
| EP | 3318895 A1 | 5/2018 |
| JP | H02287113 A | 11/1990 |
| JP | H0567195 A | 3/1993 |
| JP | 09197045 A | 7/1997 |
| JP | H10170637 A | 6/1998 |
| JP | H11063920 A | 3/1999 |
| JP | 2011089874 A | 5/2011 |
| JP | 2013113669 A | 6/2013 |
| JP | 2014059301 A | 4/2014 |
| WO | 2010149593 A1 | 12/2010 |
| WO | 2015199615 A1 | 12/2015 |
| WO | 2020101576 A1 | 5/2020 |
| WO | 2020201452 A1 | 10/2020 |

OTHER PUBLICATIONS

International Application # PCT/US2019/45187 search report dated Nov. 15, 2019.
U.S. Appl. No. 14/830,760 office action dated Mar. 27, 2019.
Japanese Application # 2018-530709 office action dated Jun. 10, 2019.
CN Application # 2018-20865151.7 Utility Model Patentability Evaluation Report dated Jul. 3, 2019.
U.S. Appl. No. 15/586,300 office action dated Jul. 11, 2019.
U.S. Appl. No. 15/586,300 office action dated Sep. 20, 2019.
Lin et al., "Chaotic lidar", IEEE Journal of Selected Topics in Quantum Electronics, vol. 10, issue 5, pp. 391-997, Sep.-Oct. 2004.
Chung et al., "Optical orthogonal codes: design, analysis and applications", IEEE Transactions on Information Theory, vol. 35, issue 3, pp. 595-604, May 1989.
Ai et al., "High-resolution random-modulation cw lidar", Applied Optics, vol. 50, issue 22, pp. 4478-4488, Jul. 28, 2011.
Morbi et al., "Short range spectral lidar using mid-infrared semiconductor laser with code-division multiplexing technique", Technical Digest, CLEO 2001, pp. 491-492 pages, May 2001.
Charbon et al., "SPAD-Based Sensors", TOF Range-Imaging Cameras, Springer-Verlag, pp. 11-38, year 2013.
Niclass et al., "A 0.18 um CMOS SoC fora 100m range, 10 fps 200×96 pixel Time of Flight depth sensor", IEEE International Solid-State Circuits Conference—(ISSCC), Session 27, Image Sensors, 27.6, pp. 488-490, Feb. 20, 2013.
Walker et al., "A 128×96 pixel event-driven phase-domain $\Delta\Sigma$-based fully digital 3D camera in 0.13μm CMOS imaging technology", IEEE International Solid-State Circuits Conference—(ISSCC), Session 23, Image Sensors, 23.6, pp. 410-412, Feb. 23, 2011.
Niclass et al., "Design and characterization of a 256×64-pixel single-photon imager in CMOS for a MEMS-based laser scanning time-of-flight sensor", Optics Express, vol. 20, issue 11, pp. 11863-11881, May 21, 2012.
Kota et al., "System Design and Performance Characterization of a MEMS-Based Laser Scanning Time-of-Flight Sensor Based on a 256×64-pixel Single-Photon Imager", IEEE Photonics Journal, vol. 5, issue 2, 15 pages, Apr. 2013.
Webster et al., "A silicon photomultiplier with >30% detection efficiency from 450-750nm and 11.6μm pitch NMOS-only pixel with 21.6% fill factor in 130nm CMOS", Proceedings of the European Solid-State Device Research Conference (ESSDERC), pp. 238-241, Sep. 7-21, 2012.
Niclass et al., U.S. Appl. No. 15/586,286, filed May 4, 2017.
Niclass et al., U.S. Appl. No. 15/586,300, filed May 4, 2017.
U.S. Appl. No. 14/830,760 office action dated Feb. 22, 2018.
Buttgen et al., "Pseudonoise Optical Modulation for Real-Time 3-D Imaging With Minimum Interference", IEEE Transactions on Circuits and Systems I: Regular Papers, vol. 54, Issue10, pp. 2109-2119, Oct. 1, 2007.
Bradski et al., "Learning OpenCV", first edition, pp. 1-50, O'Reilly Media, Inc, California, USA, year 2008.
CN Utility Model Patent No. 201520865151.7 UMPER report dated Oct. 9, 2019.
International Application PCT/US2019/45188 Search Report dated Oct. 21, 2019.
International Application # PCT/US2018/026993 search report dated Aug. 9, 2018.
U.S. Appl. No. 15/372,411 office action dated Sep. 5, 2018.
U.S. Appl. No. 14/830,760 office action dated Sep. 27, 2018.
U.S. Appl. No. 15/372,411 office action dated May 9, 2018.
U.S. Appl. No. 15/586,286 office action dated Feb. 24, 2020.
EP Application No. 20177707 Search Report dated Sep. 29, 2020.
U.S. Appl. No. 15/950,186 office action dated Jun. 23, 2020.
U.S. Appl. No. 16/532,517 Office Action dated Oct. 14, 2020.
EP Application # 20177707.5 Search Report dated Nov. 12, 2020.
JP Application # 2020001203 Office Action dated Feb. 4, 2021.
U.S. Appl. No. 16/752,653 Office Action dated Feb. 4, 2021.

\* cited by examiner

WAVEFORM DESIGN FOR A LIDAR SYSTEM WITH CLOSELY-SPACED PULSES

CROSS-REFERENCE TO RELATED APPLICATION

This application claims the benefit of U.S. provisional patent application 62/563,769, filed Sep. 27, 2017.

FIELD OF THE INVENTION

The present invention relates generally to range sensing, and particularly to devices and methods for depth mapping based on time-of-flight measurement.

BACKGROUND

Time-of-flight (ToF) imaging techniques are used in many depth mapping systems (also referred to as 3D mapping or 3D imaging). In direct ToF techniques, a light source, such as a pulsed laser, directs pulses of optical radiation toward the scene that is to be mapped, and a high-speed detector senses the time of arrival of the radiation reflected from the scene. The depth value at each pixel in the depth map is derived from the difference between the emission time of the outgoing pulse and the arrival time of the reflected radiation from the corresponding point in the scene, which is referred to as the "time of flight" of the optical pulses. The radiation pulses that are reflected back and received by the detector are also referred to as "echoes."

In order to determine the ToF of each pulse unambiguously, the time interval between consecutive pulses is chosen to be longer than the ToF. This guarantees that only one pulse is "in the air" at a given time, and that the control and processing circuitry receiving the detected signals and determining the ToF knows when each received pulse was emitted by the light source.

SUMMARY

Embodiments of the present invention that are described hereinbelow provide improved LiDAR systems and methods for ToF-based ranging and depth mapping.

There is therefore provided, in accordance with an embodiment of the invention, depth-sensing apparatus, including a laser, which is configured to emit pulses of optical radiation toward a scene. One or more detectors are configured to receive the optical radiation that is reflected from points in the scene and to output signals indicative of respective times of arrival of the received radiation. Control and processing circuitry is coupled to drive the laser to emit a succession of output sequences of the pulses with different, respective temporal spacings between the pulses within the output sequences in the succession, and to match the times of arrival of input sequences of the signals to the temporal spacings of the output sequences in order to find respective times of flight for the points in the scene.

In some embodiments, the output sequences include temporally-separated tuples of the pulses.

Alternatively, the output sequences are mutually overlapping. In one such embodiment, each output sequence includes N pulses, and consecutive output sequences have N−1 pulses in common, such that a second pulse of any given output sequence is a first pulse of a succeeding output sequence.

In some embodiments, the control and processing circuitry is configured to identify a signal output by the one or more detectors due to a stray-light pulse, to identify an emitted pulse in an input sequence that temporally coincides with the stray-light pulse, and to remove the identified pulse from the input sequence while adding to the input sequence a further pulse from a neighboring sequence in matching the times of arrival.

In a disclosed embodiment, a maximal length of the output sequences is minimized responsively to a minimal size of objects in the scene that are to be detected.

Additionally or alternatively, the control and processing circuitry is configured to construct a depth map of the scene based on the times of flight.

In some embodiments, the control and processing circuitry is configured to match the times of arrival of the pulses in each input sequence to the temporal spacings of the output sequences by calculating a respective fit between the times of arrival of the input sequence and each output sequence within a selected time period, calculating a residual of each respective fit, and identifying the output sequence yielding a minimum among all residuals as the output sequence associated with the input sequence. In a disclosed embodiment, the control and processing circuitry is configured, in calculating the respective fit, to apply a linear transformation to each output sequence to account for a tilt of the scene, and to calculate the respective fit between the times of arrival of each input sequence and each output sequence following the linear transformation. Additionally or alternatively, the output sequences are defined so as to maximize the residuals of the output sequences other than the identified output sequence There is also provided, in accordance with an embodiment of the invention, a method for depth sensing, which includes emitting a succession of output sequences of pulses of optical radiation toward a scene, with different, respective temporal spacings between the pulses within the output sequences in the succession. The optical radiation that is reflected from points in the scene is received at one or more detectors, which output signals indicative of respective times of arrival of the received radiation. The times of arrival of input sequences of the signals are matched to the temporal spacings of the output sequences in order to find respective times of flight for the points in the scene.

The present invention will be more fully understood from the following detailed description of the embodiments thereof, taken together with the drawings in which:

DETAILED DESCRIPTION OF EMBODIMENTS

The quality of measurement of the distance to each point in a scene using a LiDAR is often compromised in practical implementations by a number of environmental, fundamental, and manufacturing challenges. An example of environmental challenges is the presence of uncorrelated background light, such as solar ambient light, in both indoor and outdoor applications, typically reaching an irradiance of 1000 W/m$^2$. Some of the fundamental challenges are related to losses incurred by optical signals upon reflection from the surfaces in the scene, especially due to low-reflectivity surfaces and limited optical collection aperture, as well as electronic and photon shot noises. Other fundamental challenges are related to the conflict between the requirements for high scanning and sampling speeds and the limits imposed by a finite ToF.

These limitations often generate inflexible trade-off relationships that can push the designer to resort to solutions involving large optical apertures, high optical power, narrow field-of-view (FoV), bulky mechanical construction, low frame rate, and the restriction of sensors to operation in controlled environments.

ToF-based LiDARs that are known in the art operate typically either in a single-shot mode or in a multi-shot mode. In the single-shot mode, a single laser pulse is transmitted toward the scene for each pixel that is to appear in the depth image. In multi-shot mode, LiDAR systems that are known in the art transmit identical sequences of several pulses toward the scene. Each of these two modes has its advantages and disadvantages relating to various performance characteristics, such as throughput and frame rate, peak power, rejection of ambient light, and robustness with respect to interference.

Both modes, however, are limited in their throughput by the fundamental limitation imposed by ToF: In order to avoid confusion between the echoes of successive transmitted pulses (or pulse sequences), the time interval between successive pulses (or pulse sequences) is set to be no less than the expected maximum ToF value. In long-range LiDAR systems, the expected maximum ToF will be correspondingly large (for example, on the order of 1 μs for a range of 100 m). This example would set an upper limit on the order of 1 MHz to the frequency at which the scene is sampled, which in turn limits the LiDAR throughput and hence limits either the spatial resolution of the depth map or the FoV of the LiDAR. The maximum ToF may be dictated by maximum range of objects in the scene that are to be detected, or alternatively by the maximum range from which an echo can be received in the LiDAR, either due to drop-off of echo intensity with distance or due to turning of the acceptance angle of the optical imaging system.

Embodiments of the present invention that are described herein provide a LiDAR that is capable of avoiding the confusion between pulses or pulse sequences that are emitted at time intervals shorter than the expected values of ToF. This, in turn, enables the LiDAR to operate at a higher throughput and to map the scene either at a higher spatial resolution or with a larger FoV than otherwise possible.

In the disclosed embodiments, depth-sensing apparatus comprises a laser, which emits pulses of optical radiation toward a scene, and one or more detectors, which receive the optical radiation that is reflected from points in the scene and output signals indicative of respective times of arrival of these echo pulses. Control and processing circuitry drives the laser to emit a succession of output sequences of pulses with different, respective temporal spacings between the pulses within the output sequences. The times of arrival of input sequences of the signals are matched to the temporal spacings of the output sequences in order to find respective times of flight for the points in the scene. These times of flight are used, for example, in constructing a depth map of the scene.

In a disclosed embodiment, the light source emits the pulses in each output sequence at predetermined but uneven intervals. A series of numbers denoting the uneven intervals within a sequence are referred to as the "coding" of the given sequence. The codings of successive output sequences are designed to differ from one another according to a metric, which will be described in detail in the context of the figures. When this approach is used, the received echoes may be uniquely matched to a given output sequence, and the time interval between two consecutive output sequences may be substantially shorter than the expected ToF, with the above-mentioned advantages due to increased throughput and sampling rate.

Echoes of the emitted pulses are received by the detectors, which output corresponding signals to the control and processing circuitry of the LiDAR. Each sequence of the echoes can be assumed to have been reflected by a linear (planar) region of the scene, which is a reasonable assumption for a densely-sampled scene. The tilt of the planar region with respect to the line-of-sight from the LiDAR to the scene will manifest itself as a linear stretch of an output sequence by the time it reaches the detectors as echoes, and the distance to the scene causes a temporal shift in the output sequence due to ToF.

The control and processing circuitry performs a fit of a received sequence of echoes to the output sequences, with a linear stretch of the sequence as an adjustable parameter, and calculates the residual of each fit. Each residual is further minimized by adjusting for the assumed scene tilt (sequence stretch). The output sequence for which the residual of the fit reaches a minimum value is identified by the control and processing circuitry with the received sequence. As the emission times of each of the pulses in the identified output sequence are known, the ToF can now be calculated for each of the echoes as the difference between the time of arrival of the echo and the time of emission of the corresponding emitted pulse.

Figure 2:
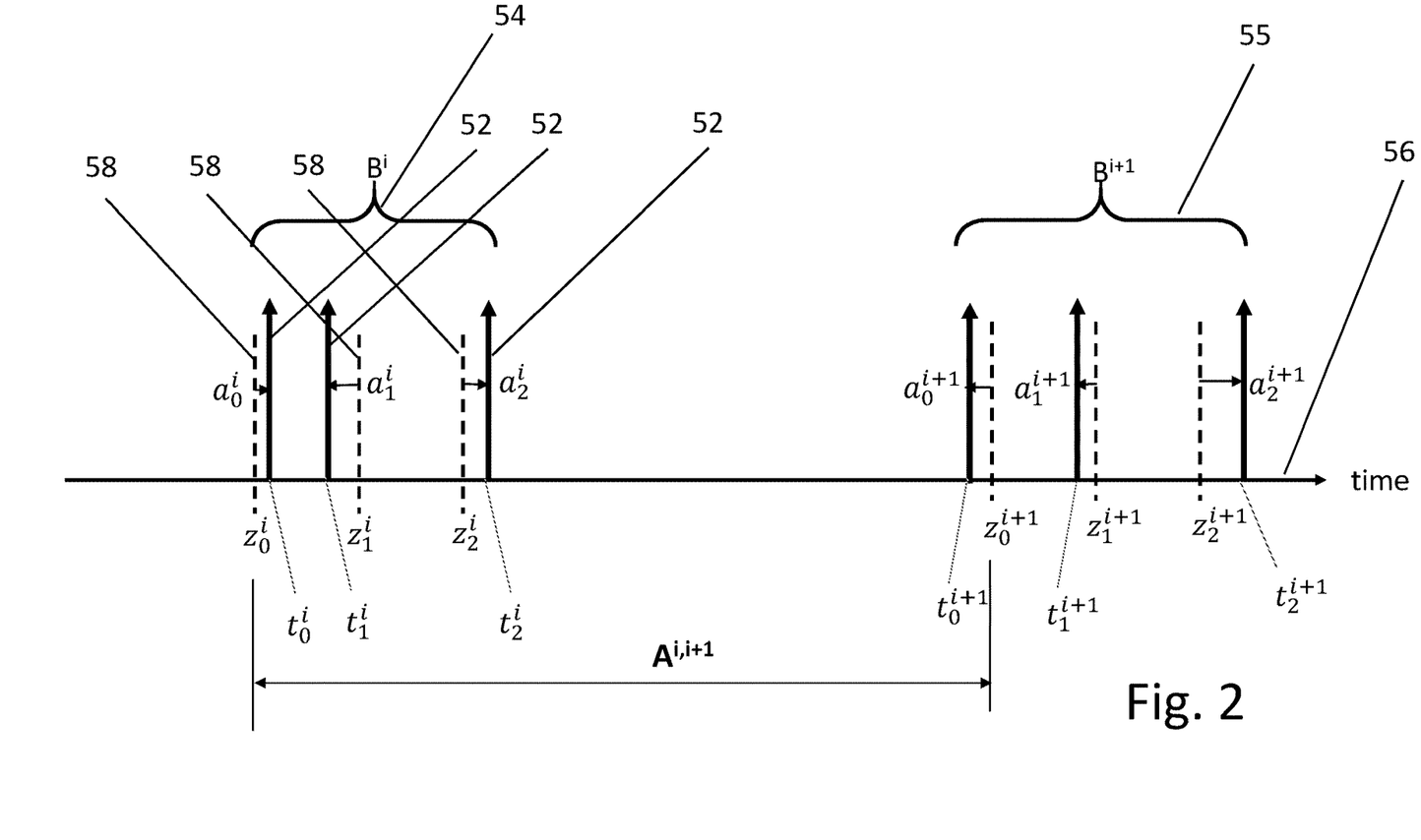
FIG. 2 is a schematic plot of emitted pulses in tuple structures, in accordance with an embodiment of the invention.
Figure 3:
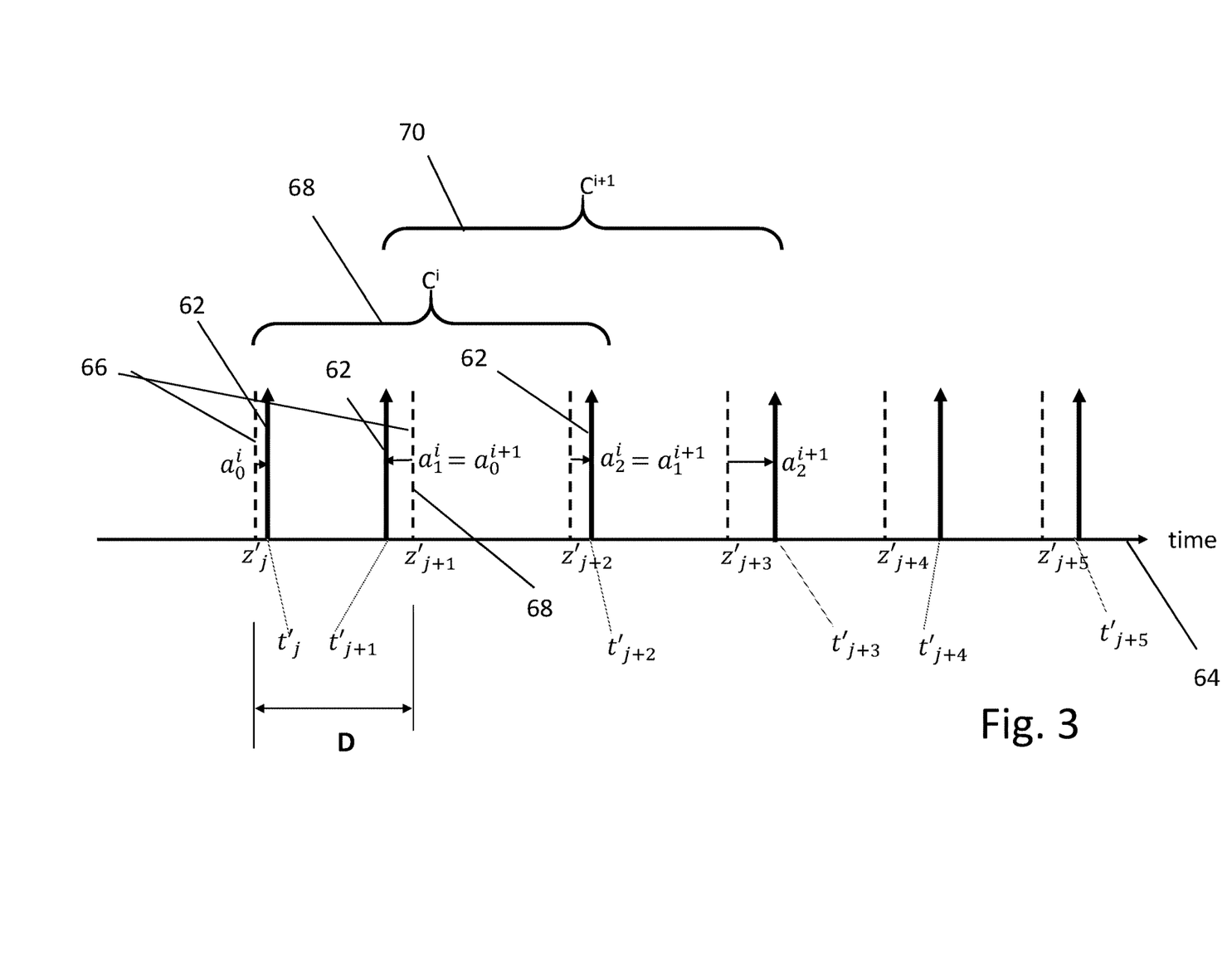
FIG. 3 is a schematic plot of emitted pulses in dither structures, in accordance with another embodiment of the invention.

The disclosed embodiments make use of two different pulse structures, which will be further detailed in the context of FIGS. 2-3: The first structure, referred to as a "tuple" structure, comprises discrete, i.e. temporally separated, sequences of pulses. In a tuple structure, the typical number of pulses is three, and the tuple duration is typically an order of magnitude lower than the interval between tuples.

The second structure, referred to as a "dither" structure, comprises a continuous series of pulses, wherein the temporal location of each pulse is modulated (i.e., shifted) around a fiducial, with a typical dither between 50% and 200% of the average interval between pulses. For a general dither structure, every N consecutive pulses form a dither structure with an associated code, and a new structure (and a new associated code) starts after a shift of one pulse. Consequently, consecutive dither structures of N pulses overlap by N−1 pulses.

Although in the disclosed embodiments, three pulses are used for both tuple and dither structures, other numbers of pulses may alternatively be used, as will be detailed below.

A small portion of each pulse emitted by the light source may be reflected by an optical or mechanical surface of the LiDAR directly back to the detectors. These stray-light pulses received by a detector may briefly blind it, and in this way occlude one or more of the echoes received from the scene. The dither sequence can be selected so as to prevent consistent blinding of echoes from a scene located at any expected distance from the LiDAR. For this purpose, the control and processing circuitry checks, in a general case, N received echoes and compares the times of arrival of the echoes to known times of arrival for stray-light pulses. In case one of the echoes coincides with a stray-light pulse, this echo is ignored, and an echo adjacent to the original N echoes is added to the sequence for purposes of fitting to relevant output sequences. In other words, in processing the stream of echoes, it is assumed that at most one echo coincides with a stray-light pulse in a code of length N. If a match to a code is found under these conditions (N−1 matches with proper echoes, one match to a stray time), the detection is confirmed using another proper echo. This assumption can be made valid for any possible target ToF if the coding series of pulses is designed as defined hereinbelow.

If a scene contains a small object, i.e., an object that presents a small lateral dimension to the LiDAR, the object may not be detected unless a given minimum number of echoes is received from it. The sequence code can be optimized for detecting small objects by minimizing the maximum code length of the output sequences.

The resolution of the mapping corresponds to the sampling rate of the scene. For tuple structures this is typically the interval between neighboring tuple structures, and thus independent of the specific code of the tuple structure. For dither structures the resolution may be increased by reducing the pulse-to-pulse spacing, i.e., modifying the code.

Figure 1:
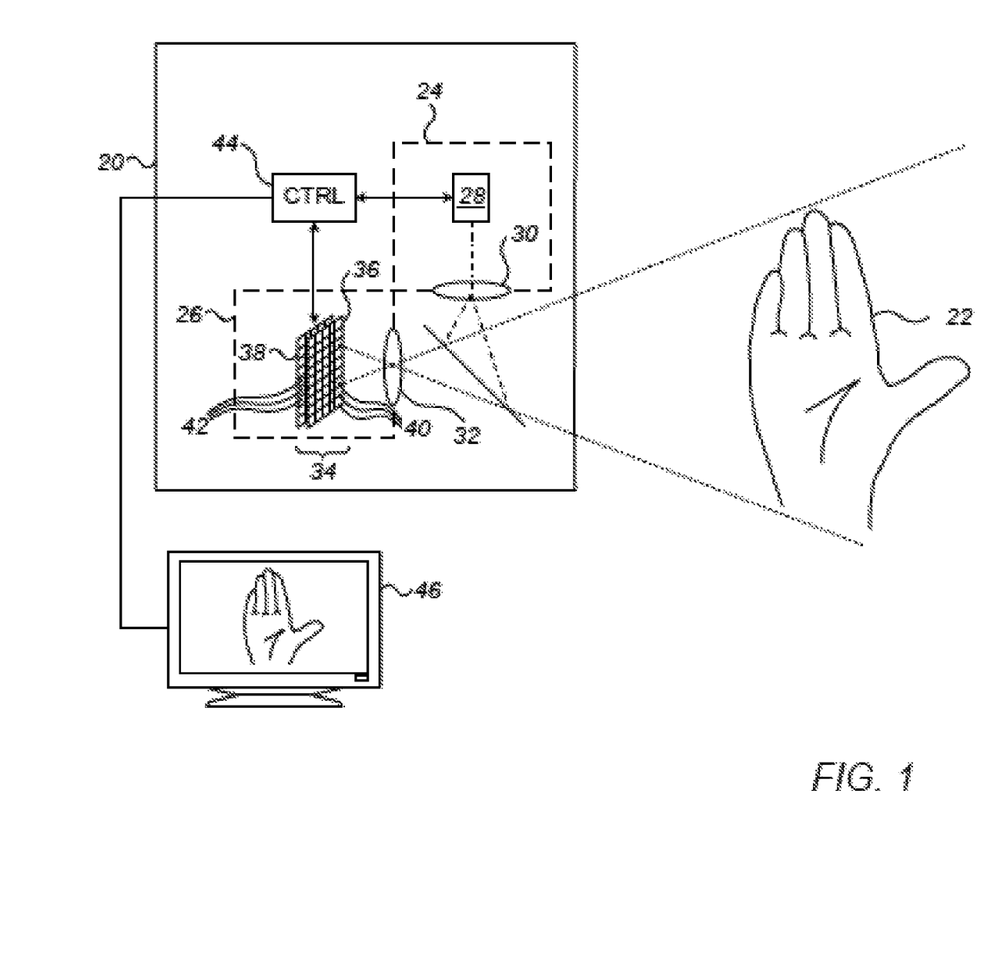
FIG. 1 is a schematic side view of a depth-sensing apparatus, in accordance with an embodiment of the invention.

FIG. 1 is a schematic side view of a depth-sensing apparatus 20, in accordance with an embodiment of the invention. In the pictured embodiment, device 20 is used to generate depth maps of a scene including an object 22, for example a part of the body of a user of the device. To generate the depth map, an illumination assembly 24 directs pulses of light toward object 22, and an imaging assembly 26 measures the ToF of the photons reflected from the object. (The term "light," as used in the present description and in the claims, refers to optical radiation, which may be in any of the visible, infrared, and ultraviolet ranges.)

Illumination assembly 24 typically comprises a pulsed laser 28, which emits short pulses of light, with pulse duration in the nanosecond range and repetition frequency in the range of 0.5-50 MHz, for example. Projection optics 30 direct the light toward object 22. Alternatively, other pulse durations and repetition frequencies may be used, depending on application requirements. In some embodiments, illumination assembly 24 comprises a scanner, such as one or more rotating mirrors (not shown), which scans the beam of pulsed light across the scene. In other embodiments, illumination assembly comprises an array of lasers, in place of laser 28, which illuminates different parts of the scene either concurrently or sequentially. More generally, illumination assembly 24 may comprise substantially any pulsed laser or laser array that can be driven to emit sequences of pulses toward object 22 at irregular intervals.

Imaging assembly 26 comprises objective optics 32, which image object 22 onto one or more detectors, represented in the figure by a sensing array 34, so that photons emitted by illumination assembly 24 and reflected from object 22 are incident on the sensing device. In the pictured embodiment, sensing array 34 comprises a sensor chip 36 and a processing chip 38, which are coupled together, for example, using chip stacking techniques that are known in the art. Sensor chip 36 comprises one or more high-speed photodetectors, such as avalanche photodiodes.

In some embodiments, sensor chip 36 comprises a single photodetector, such as a single avalanche photodiode or SPAD. In other embodiments, the photodetectors in sensor chip 36 comprise an array of SPADs 40, each of which outputs a signal indicative of the times of incidence of photons on the SPAD following emission of pulses by illumination assembly 24. Processing chip 38 comprises an array of processing circuits 42, which are coupled respectively to the sensing elements. Both of chips 36 and 38 may be produced from silicon wafers using well-known CMOS fabrication processes, based on SPAD sensor designs that are known in the art, along with accompanying drive circuits, logic and memory. For example, chips 36 and 38 may comprise circuits as described in U.S. Patent Application Publication 2017/0052065 and/or U.S. Patent Application Publication 2017/0179173, both of whose disclosures are incorporated herein by reference. Alternatively, the designs and principles of detection that are described herein may be implemented, mutatis mutandis, using other circuits, materials and processes. All such alternative implementations are considered to be within the scope of the present invention.

Imaging assembly 26 outputs signals that are indicative of respective times of arrival of the received radiation at each SPAD 40 or, equivalently, from each point in the scene that is being mapped. These output signals are typically in the form of respective digital values of the times of arrival that are generated by processing circuits 42, although other signal formats, both digital and analog, are also possible. A controller 44 reads out the individual pixel values and generates an output depth map, comprising the measured ToF—or equivalently, the measured depth value—at each pixel. The depth map is typically conveyed to a receiving device 46, such as a display or a computer or other processor, which segments and extracts high-level information from the depth map.

As explained above, controller 44 drives the laser or lasers in illumination assembly 24 to emit sequences of pulses in a predefined temporal pattern, with irregular intervals between the pulses in the sequence. Processing chip 38 or controller 44 then finds the respective times of flight for the points in the scene by matching the times of arrival of input sequences of the signals to the temporal spacings of the output sequences, which are shared with controller 44. The process of matching will be further detailed in the context of FIGS. 2-3, below.

Although the present description relates to controller and processing chip 38 as separate entities, with a certain division of functions between the controller and processing chip, in practice these entities and their functions may be combined and implemented monolithically on the same integrated circuit. Alternatively, other divisions of functionality between these entities will also be apparent to those skilled in the art and are considered to be within the scope of the present invention. Therefore, in the present description and in the claims, controller 44 and processing chip 38 are referred to collectively as "control and processing circuitry," and this term is meant to encompass all implementations of the functionalities that are attributed to these entities.

FIG. 2 is a schematic plot of emitted pulses 52 arranged in tuple structures 54 and 55, in accordance with an embodiment of the invention. Pulses 52 are emitted by pulsed laser 28. In the present embodiment each tuple structure comprises three pulses 52, shown as upright arrows on a time axis 56. Two tuple structures 54 and 55 are shown in FIG. 2, with tuple structure 54 labelled as $B^i$ for the $i^{th}$ tuple structure and tuple structure 55 labelled as $B^{i+1}$ for the $i+1^{st}$ tuple structure. Index i represents a series of positive integers.

Fiducials $z_j^i$ on time axis 56 are shown as dotted lines 58, wherein i is the index of tuple structure $B^i$ and j is the index of the pulses within the structure. For a tuple structure comprising three pulses, j=0,1,2. Fiducials $Z_j^i$ are equidistant from each other within each tuple structure $B^i$ and are used for defining temporal shifts $a_j^i$, wherein, as for the fiducials, the index i refers to the $i^{th}$ structure $B^i$ and j is the index within the structure. Each $a_j^i$ is defined as a signed difference between fiducial $z_j^i$ and a temporal position $t_j^i$ of the $j^{th}$ pulse within the $i^{th}$ structure $B^i$: $a_j^i = t_j^i - z_j^i$. Alternatively, the pulse intervals can be defined as the difference between the pulse positions and the code center, which is the average of the pulse times. The temporal distance $A^{i, i+1}$ between structures $B^i$ and $B^{i+1}$ is defined as the temporal difference between the first fiducial of each tuple: $A^{i,i+1} = z_0^{i+1} - z_0^i$. The temporal distance between tuples $A^{i,i+1}$ may be either uniform or different between consecutive tuples.

FIG. 3 is a schematic plot of emitted pulses 62 arranged in dither structures 68 and 70, in accordance with another embodiment of the invention. Pulses 62 are emitted by pulsed laser 28. In the present embodiment, emitted pulses 62, shown as upright arrows on a time axis 64, are labelled by index j, wherein the index represents a series of consecutive positive integers. The temporal position of the $j^{th}$ pulse is labelled by $t'_j$, and is shifted with respect to a fiducial $z'_j$, wherein all consecutive fiducials are equidistant from each other with a temporal spacing of D. D is the average temporal distance between consecutive pulses 62. The fiducials $z'_1$ are marked by dotted lines 66. Alternatively, the code can be defined in terms of the differences of the temporal positions of the pulses from the code center (which varies as a result of the interval modulation).

A dither structure 68, labelled as $C^i$, with i referring to the $i^{th}$ dither structure, comprises three emitted pulses j, j+1, and j+2. Index i represents a series of positive integers. A subsequent dither structure 70, labelled as $C^{i+1}$, comprises three pulses j+1, j+2, and j+3. Thus, consecutive dither structures $C^i$ and $C^{i+1}$ overlap for pulses j+1 and j+2. This overlap differentiates dither structures $C^i$ and $C^{i+1}$ from tuple structures $B^i$ and $B^{i+1}$ of FIG. 2, as there is no overlap between consecutive tuple structures. However, as the same mathematical operations will be performed below for both optimization and fitting for both tuple structures and dither structures, the same notation $a_j^i$ will be used for temporal shifts of pulses 62 in dither structures as was used for tuple structures in FIG. 2, with a definition that takes into account the differences in indexing between the two structures.

For the $i^{th}$ dither structure $C^i$, the temporal shift $a_j^i$ is defined as the signed difference between fiducial $z'_j$ and temporal position $t'_j$ of the $j^{th}$ pulse: $a_j^i = t'_j - z'_j$, wherein the index i is determined by the association of the temporal shift with the $i^{th}$ dither structure $C^i$. This notation is further clarified by observing the notation for the temporal shifts for dither structures $C^i$ and $C^{i+1}$ (dither structures $C^{i-1}$ and $C^{i+2}$ are ignored for the sake of simplicity): Pulse 0 in dither structure $C^i$ is shifted by $a_0^i$. Pulse 1 in dither structure $C^i$ is shifted by $a_1^i$, but as this pulse is also pulse 0 in dither structure $C^{i+1}$, $a_1^i = a_0^{i+1}$. Similar equality is found between pulse 2 of dither structure $C^i$ and pulse 1 of dither structure $C^{i+1}$. Pulse 2 of dither structure $C^{i+1}$ is already outside dither structure $C^i$.

Both tuple structures and dither structures can be used for mapping object 22 with two degrees of freedom: the distance from depth-sensing apparatus 20 to the object and the inclination of the object in the direction of relative movement between the depth-sensing apparatus and the object. (The relative movement may be caused by a scanner which scans the beam of pulsed light across the object, or due to a movement of the object, or both.) In order to map these two degrees of freedom, a minimum number of three received pulses is required, wherein the third degree of freedom is used to resolve code association ambiguity, as explained below. The disclosed embodiments therefore use three-pulse tuple structures, as well as three-pulse dither structures. The three temporal shifts ($a_0^i$, $a_1^i$, $a_2^i$) for structure i (either a tuple or a dither structure) define the code for that structure.

In other embodiments of the present invention, tuple or dither structures with more than three pulses (for example four, five, or six pulses) may be used for mapping with two or more degrees of freedom. Alternatively, in some cases tuples or dither structures of only two pulses may be used.

Figure 4:
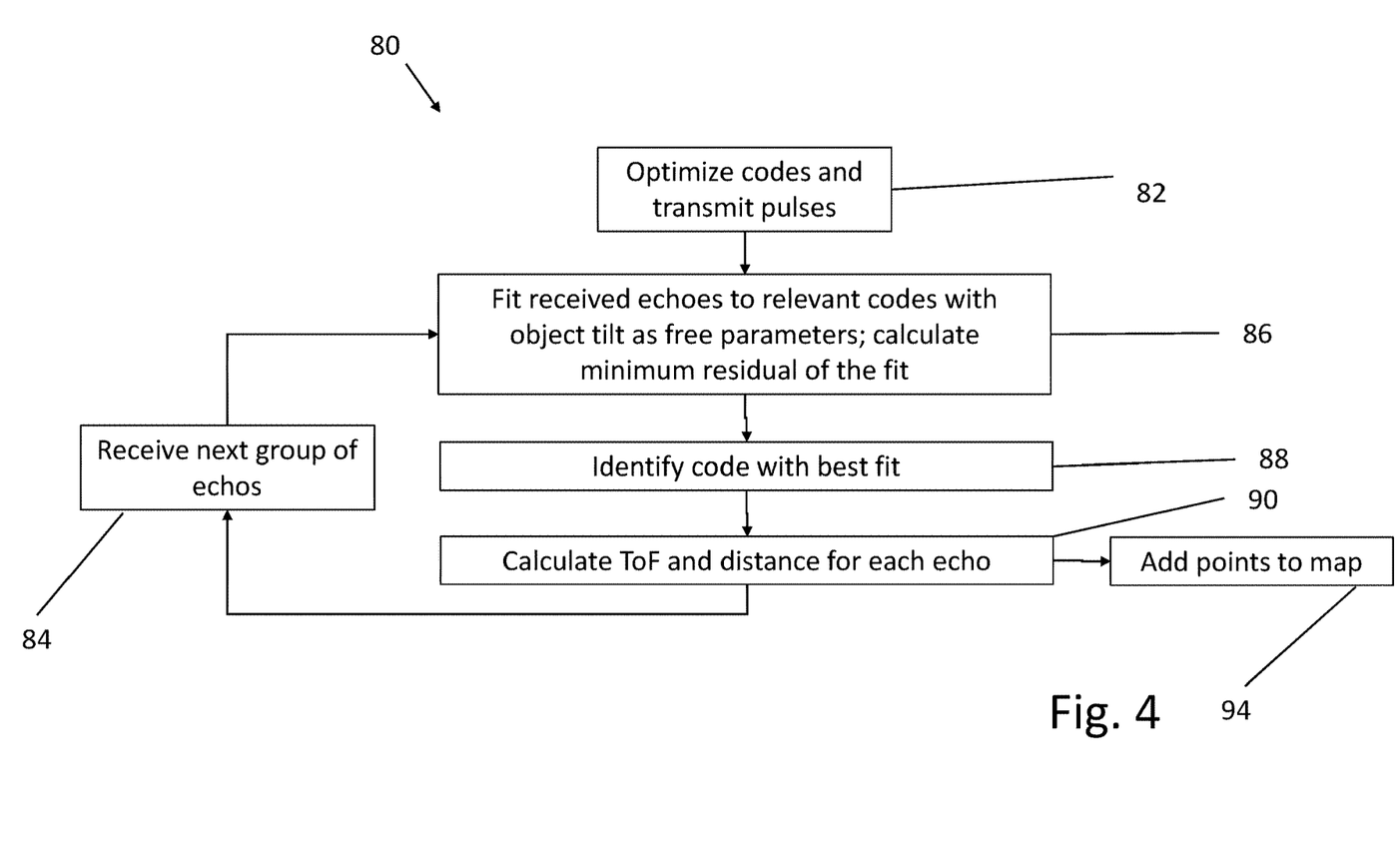
FIG. 4 is a flowchart that schematically illustrates a method for optimizing and applying codes of tuple and dither structures, in accordance with an embodiment of the invention.

FIG. 4 is a flowchart 80 that schematically illustrates a method for optimizing and applying codes of tuple and dither structures, in accordance with an embodiment of the invention. This method can be applied, for example by controller 44, in setting the pulse timing of laser 28 in operation, as well as in processing the signals output by sensor chip 36. Alternatively, the codes can be pre-computed.

In an optimization step 82, M codes ($a_0^i$, $a_1^i$, $a_2^i$) are optimized, wherein index i=1, ..., M, and M may take any suitable value, depending on application requirements. The objective of the optimization is to ensure that the codes are sufficiently different to enable a unique identification of the code with a best fit to the received echoes. The optimization is performed by a maximization of the minimum value with i±k of the following expression:

$$\left\| \begin{bmatrix} 1 & e_0^i \\ 1 & e_1^i \\ 1 & e_2^i \end{bmatrix}^P \begin{bmatrix} e_0^k \\ e_1^k \\ e_2^k \end{bmatrix} - \begin{bmatrix} e_0^i \\ e_1^i \\ e_2^i \end{bmatrix} \right\|,$$

wherein $X^P$ denotes an orthogonal projection on the columns of matrix X, and $$e_i^l = (a_i^l + z_i^l) - \frac{1}{N} \sum_{j=0\ldots N-1} (a_j^l + z_j^l).$$

Laser 28 transmits sequences of pulses toward a scene, with the intervals between the pulses determined by the optimized codes.

In a receiving step 84, sensor chip 36 receives three echoes (three pulses reflected by object 22). In a fitting step 86, controller 44 fits the received echoes to relevant codes. The relevant codes are chosen among codes whose known transmission times are within the expected transmission times of the received echoes, considering the operating range of depth-sensing apparatus 20. Controller 44 can expand (stretch) a relevant code i ($a_0^i$, $a_1^i$, $a_2^i$) linearly to a hypothesized code ($\tilde{a}_0^i$, $\tilde{a}_1^i$, $\tilde{a}_2^i$), wherein the tilt of object 22, i.e., a linear expansion of the code, is used as a free parameter. The controller calculates the residual of the fit as:

$$\left\| \begin{bmatrix} 1 & e_0 \\ 1 & e_1 \\ 1 & e_2 \end{bmatrix}^P \begin{bmatrix} t_0 \\ t_1 \\ t_2 \end{bmatrix} \right\|$$

wherein $t_0$, $t_1$, and $t_2$ are the times at which the echoes are received. The residual for each code is minimized by adjusting the object tilt for that code. The third degree of freedom will cause the residue to be large in case of a mismatch between the code and echo time set, thus resolving any possible ambiguity.

In an identification and calculation step 88, controller 44 identifies the code with the best fit (smallest residual) as the output structure that emitted the pulses that were received as the echoes at times $t_0$, $t_1$, and $t_2$. When the emitted pulses are arranged in tuple structures, as shown in FIG. 2, and assuming, for example, that the identified code is that of tuple structure $B^i$, the echo received at time $t_0$ corresponds to the pulse emitted at time $t_0^i$, the echo received at time $t_1$ corresponds to the pulse emitted at time $t_1^i$, and the echo received at time $t_2$ corresponds to the pulse emitted at time $t_2^i$.

Alternatively, when the emitted pulses are arranged in dither structures, as shown in FIG. 3, and assuming, for example, that the identified code is that of dither structure $C^i$, the echo received at time $t_0$ corresponds to the pulse emitted at time $t'_j$, the echo received at time $t_1$ corresponds to the pulse emitted at time $t'_{j+1}$, and the echo received at time $t_2$ corresponds to the pulse emitted at time $t'_{j+2}$.

In a calculation step 90, controller 44 computes the ToF for each of the received echoes as the difference between the time the echo was received and the time—based on identification step 88—when the corresponding pulse was emitted. The distance to each point on object 22 from which an echo was returned is calculated from the ToF as c×ToF/2, wherein c is the speed of light. Controller 44 transfers the calculated distances to a map of object 22 in a mapping step 94. If more echoes are to be received, the process returns to receiving step 84.

As noted earlier, the dither structure can be designed to prevent blinding of echoes. A small portion of each pulse emitted by the pulsed laser 28 may be reflected by an optical or mechanical surface of the LiDAR directly back to sensor chip 36. In case such a stray-light pulse coincides with an echo received from object 22, the echo may not be detected due to the blinding of sensor chip 36 by the stray-light pulse. To alleviate this problem, controller 44 compares the arrival times of N echoes to known times of arrival of stray-light pulses. In case one of the N echoes coincides with a stray-light pulse, this echo is ignored, an echo adjacent to the N echoes is added to the sequence, and the fit of the modified echo sequence to relevant output sequences is calculated.

Typically, three echoes are used for a code (N=3), requiring that out of four consecutive echoes, three are far from stray-light returns. The criterion for dither structures is formulated as follows: Denote by $d_j$ the time intervals between pulses in the coded sequence, and L the number of intervals in the coded sequence. The set of sums of intervals of length k is:

$$A_k = \{0 \le i \le L-1 | d_i + \ldots + d_{mod(i+k-1,L)}\},$$

wherein the elements $d_j$ represent the intervals between pulses in the codes. The elements of $A_k$ are denoted by $b_k^l$. When using three out of four echoes, as explained above, the expression to be maximized is $|b_{k_0}^{l_0} - b_{k_1}^{l_1}|$ for $(k_0, l_0) \ne (k_1, l_1)$ and $k_0 \le 3$, wherein $k_j$ is the number of intervals in each sum, and $l_j$ is an index that enumerates the intervals.

Alternatively or additionally, the codes can be optimized to minimize the size of detectable objects. The optimization comprises minimizing the maximum code length. Referring to the code lengths $b_k^l$ calculated above, for a 3-pulse dither structure the quantity to be minimized over the indices 1 is $b_3^l$. For a 4-pulse dither structure the quantity to be minimized over the indices 1 is $b_4^l$. The sequence of pulses in the code should be chosen to span the maximum ToF ambiguity range, meaning that if the ambiguity persists for 2 μs, for example, then the sequence length should be longer than 2 μs.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Depth-sensing apparatus, comprising:
    a laser, which is configured to emit pulses of optical radiation toward a scene;
    one or more detectors, which are configured to receive the optical radiation that is reflected from points in the scene and to output signals indicative of respective times of arrival of the received radiation; and
    control and processing circuitry, which is coupled to drive the laser to emit a succession of output sequences of the pulses such that successive output sequences within the succession have different, respective temporal spacings between the pulses within each of the successive output sequences, and to match the times of arrival of input sequences of the signals to the temporal spacings of the output sequences in order to find respective times of flight for the points in the scene.

2. The depth-sensing apparatus according to claim 1, wherein the output sequences comprise temporally-separated tuples of the pulses.

3. The depth-sensing apparatus according to claim 1, wherein the output sequences are mutually overlapping.

4. The depth-sensing apparatus according to claim 3, wherein each output sequence comprises a number N of pulses, such that N>1, and wherein consecutive output sequences have N−1 pulses in common, such that a second pulse of any given output sequence is a first pulse of a succeeding output sequence.

5. The depth-sensing apparatus according to claim 1, wherein the control and processing circuitry is configured to identify a signal output by the one or more detectors due to a stray-light pulse, to identify an emitted pulse in an input sequence that temporally coincides with the stray-light pulse, and to remove the identified pulse from the input sequence while adding to the input sequence a further pulse from a neighboring sequence in matching the times of arrival.

6. The depth-sensing apparatus according to claim 1, wherein the control and processing circuitry is configured to construct a depth map of the scene based on the times of flight.

7. The depth-sensing apparatus according to claim 1, wherein the control and processing circuitry is configured to match the times of arrival of the pulses in each input sequence to the temporal spacings of the output sequences by calculating a respective fit between the times of arrival of the input sequence and each output sequence within a selected time period, calculating a residual of each respective fit, and identifying the output sequence yielding a minimum value of the residual among all residuals as the output sequence associated with the input sequence.

8. The depth-sensing apparatus according to claim 7, wherein the control and processing circuitry is configured, in calculating the respective fit, to apply a linear transformation to each output sequence to account for a tilt of a planar region of the scene relative to a line of sight of the apparatus, and to calculate the respective fit between the times of arrival of each input sequence and each output sequence following the linear transformation.

9. A method for depth sensing, comprising:
   emitting a succession of output sequences of pulses of optical radiation toward a scene, such that successive output sequences within the succession have different, respective temporal spacings between the pulses within each of the successive output sequences;
   receiving the optical radiation that is reflected from points in the scene at one or more detectors, which output signals indicative of respective times of arrival of the received radiation; and
   matching the times of arrival of input sequences of the signals to the temporal spacings of the output sequences in order to find respective times of flight for the points in the scene.

10. The method according to claim 9, wherein the output sequences comprise temporally-separated tuples of the pulses.

11. The method according to claim 9, wherein the output sequences are mutually overlapping.

12. The method according to claim 11, wherein each output sequence comprises a number N of pulses, such that N>1, and wherein consecutive output sequences have N−1 pulses in common, such that a second pulse of any given output sequence is a first pulse of a succeeding output sequence.

13. The method according to claim 9, wherein matching the times of arrival comprises identifying a signal output by the one or more detectors due to a stray-light pulse, identifying an emitted pulse in an input sequence that temporally coincides with the stray-light pulse, and removing the identified pulse from the input sequence while adding to the input sequence a further pulse from a neighboring sequence in matching the times of arrival.

14. The method according to claim 9, and comprising constructing a depth map of the scene based on the times of flight.

15. The method according to claim 9, wherein matching the times of arrival comprises calculating a respective fit between the times of arrival of the input sequence and each output sequence within a selected time period, calculating a residual of each respective fit, and identifying the output sequence yielding a minimum value of the residual among all residuals as the output sequence associated with the input sequence.

16. The method according to claim 15, wherein calculating the respective fit comprises applying a linear transformation to each output sequence to account for a tilt of a planar region of the scene relative to a line of sight of the apparatus, and calculating the respective fit between the times of arrival of each input sequence and each output sequence following the linear transformation.

* * * * *